United States Patent [19]

Goforth, Jr.

[11] Patent Number: 5,154,518
[45] Date of Patent: Oct. 13, 1992

[54] RING STRUCTURE FOR BEARING CHOCKING ASSEMBLY

[76] Inventor: John A. Goforth, Jr., 213 Kenwood Cir., Gadsden, Ala. 35901

[21] Appl. No.: 785,515

[22] Filed: Oct. 31, 1991

[51] Int. Cl.⁵ .................... F16C 43/04; F16C 23/06
[52] U.S. Cl. ................................. 384/584; 384/563
[58] Field of Search ............... 384/583, 584, 585, 517, 384/519, 538, 563

[56] References Cited

U.S. PATENT DOCUMENTS

| | | | |
|---|---|---|---|
| 3,733,108 | 5/1973 | Petros et al. | 384/585 |
| 3,746,412 | 7/1973 | Hay | 384/563 |
| 3,782,796 | 1/1974 | Rickley et al. | 384/584 |
| 3,799,636 | 3/1974 | Kersting et al. | 384/563 X |
| 3,912,345 | 10/1975 | Overton | 384/584 |
| 3,966,282 | 6/1976 | Overton | 384/584 |
| 4,286,830 | 9/1981 | Salter, Jr. | 384/584 |

*Primary Examiner*—Thomas R. Hannon
*Attorney, Agent, or Firm*—Phillips & Beumer

[57] ABSTRACT

A bearing chocking assembly for mill rolls includes an inner ring engageable with the bearing structure and having on its outer face axially inclined wedge-shaped cam surfaces. These surfaces are arranged to come into contact with similar mating surfaces on the inward face on an outer ring. Both of the rings have circumferential flanges with axial holes around their entire circumference to enable the flanges to be bolted together upon being rotated to effect axial positioning of the assembly. The inner ring rests on a surface of the mill roll shaft and is secured in place by a split thrust ring disposed in the shaft groove. This assembly enables a mill roll to be removed for regrinding and replaced without separating the rings from one another and avoids the need for removing a split inner adjustment ring from the groove. Provision of flanges with holes around their entire circumferences allows for fine adjustments over a wide range of positions.

14 Claims, 4 Drawing Sheets

RING STRUCTURE FOR BEARING CHOCKING ASSEMBLY

FIELD OF THE INVENTION

This invention relates to devices for chocking of bearings on mill rolls.

BACKGROUND OF THE INVENTION

Rolling mills employ elongated parallel rolls for exerting compressing force on metal feed stock, forming it into thinner strip or plate configuration. The rolls have reduced diameter end regions or "necks" which are journalled for rotation by roller bearings supported in a mill stand. Adjustable bearing chocking devices at each end of the roll hold the bearings in place and enable axial adjustment of bearing clearance. The chocking devices, upon being adjusted, are held in position by engagement with annular grooves provided in the roll necks.

In order to maintain required precision in the rolled product, the rolls must be frequently removed from the mill stand and reground to restore their surface finish. Useful life of a roll before refinishing its surface may be as short as a few hours. To minimize mill down-time during roll refurbishment operations, the bearing chocking apparatus should be easily installed, removed and adjusted.

Prior devices for chocking bearings on mill rolls have taken various forms. One type of device employs a pair of rings threaded together to provide an annular assembly of adjustable lengths. The assembly of threaded rings is positioned between a locking collar and the bearing to be chocked, and the rings are rotated to extend the length of the assembly until the bearing is properly chocked.

This approach presents difficulties in that the threaded rings are difficult to machine, and they tend to become contaminated with dust and other particles in operation, resulting in galling.

U.S. Pat. Nos. 3,912,345 and 3,966,282, issued Oct. 14, 1975, and Jun. 29, 1976, respectively, to Overton, disclose a mill roll chocking assembly having a segmented inner ring which is received in an annular groove in a roll neck. An outer ring is provided which can be slipped over the inner ring segments and into engagement with a bearing retainer. Wedge-shaped cam surfaces on the inner ring segments and the outer ring coact to axially move the outer ring as it is rotated relative to the inner ring, thereby axially adjusting the position of the bearing retainer and effecting chocking of the bearings. The inner ring is keyed to the roll neck to prevent relative rotation therebetween. The outer ring is bolted to the inner ring once the outer ring has been positioned to chock the roll bearings. While providing a distinct improvement over threaded ring assemblies, the device shown in these patents presents a disadvantage in that the inner and outer rings must be removed from the chocking assembly in order to allow the assembly to be slid off the roll neck inasmuch as the inner ring is located in the shaft groove. Removal of the rings requires unbolting them and rotating the outer ring to disengage the wedge segments of the outer ring from mating segments of the inner ring so as to allow the outer ring to be moved axially over the inner ring and off the assembly. The hinged inner ring must then be unlocked and removed from the shaft groove. A reverse sequence of steps is required in re-assembling the chocking device. Manipulations required in this procedure are cumbersome and labor intensive, particularly for large mills where the rings are heavy enough to require the efforts of two men using special lifting equipment. It is desired to provide an improved locking device using a pair of rings with mating wedged surfaces, but one in which the rings need not be removed from the chocking assembly to allow the assembly to be slid off the roll neck. This would significantly reduce the down-time required for roll refinishing and improve the efficiency of the mill.

A further disadvantage with the device of the patents is that inasmuch as the outer ring must be slid axially over the inner ring during assembly and disassembly, radially extending flange segments on the respective rings, which are provided with a series of holes for securing the rings when adjusted, must have a limited length around the circumference of the rings. This imposes a limit on the number of holes available for making adjustments. A ring structure in which the flange of both rings can be extended around their entire circumference would enable finer adjustments to be made.

SUMMARY OF THE INVENTION

The present invention is directed to an improved bearing chocking device for mill rolls in which an inner ring having wedge-shaped cam surfaces, preferably on its outward face, is disposed over the roll shaft and has a base portion that bears inwardly against the bearing structure. The inner ring does not fit within the annular groove of the shaft and thus need not be split or hinged. It does not need to be removed to allow the assembly to be slid off the shaft. An outer ring having wedge-shaped cam surfaces, preferably on its inward face, is disposed so that the cam surfaces of the two rings come into contact with one another, allowing axial adjustments by relative rotation of the rings. The outer ring adjacent its juncture with the shaft is secured in placed by abuttment with a split thrust ring or collar which engages the axial groove of the shaft. This arrangement takes advantage of using a pair of rings with mating wedge-shaped cam surfaces to obtain axial adjustment, as compared to threaded rings, while providing a chocking assembly that does not require removal of the rings for enabling the assembly to be taken of or reinserted on the shaft.

Chocking devices embodying the invention require removal and replacement of only one major part, the split thrust ring, to allow the assembly to be slid off or onto the shaft to enable roll grinding. Minimum time and effort are required for removing and installing the split thrust ring, as compared to handling of the inner and outer rings. Down-time and labor costs are therefor minimized.

A further advantage is provided in that flanges by means of which the rings are secured to one another upon being adjusted may extend around the entire circumference of the two rings. This enables fine adjustments to be made over a wide range of positions.

DETAILED DESCRIPTION OF THE DRAWINGS

Figure 1:
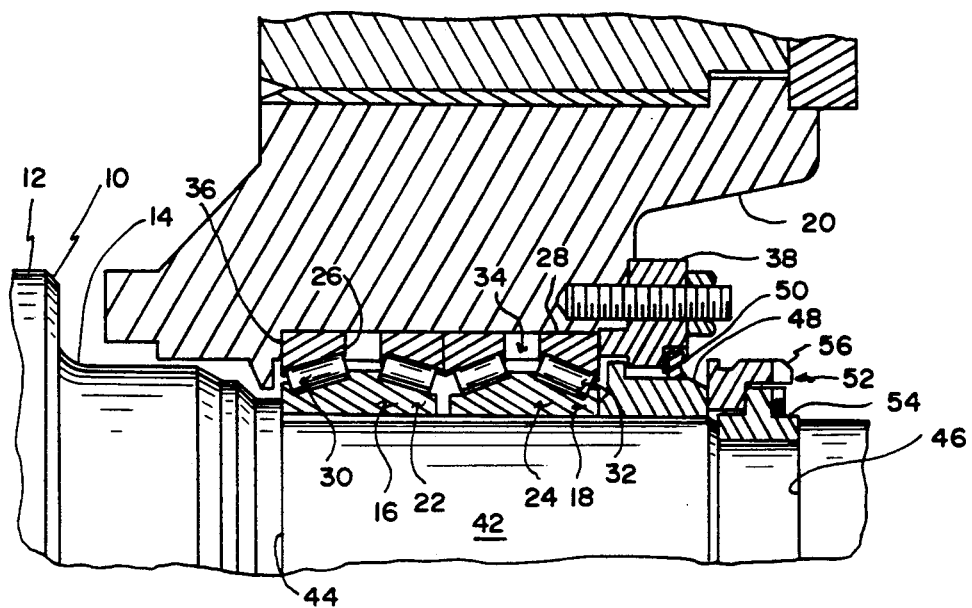
FIG. 1 is a sectional view showing a prior art bearing chocking assembly.

Referring to FIG. 1 of the drawings, there is shown the prior art chocking assembly disclosed in the above-referenced patents. The assembly is shown installed on a roll 10 of conventional configuration having a cylindrical rolling surface 12 with identical reduced diameter necks 14 formed on opposite ends. Each of the necks is journalled for rotation by a pair of roller bearings 16, 18 supported in a mill stand chock 20. The bearings are positioned side by side and cooperate to journal the mill roll 10. The bearings have inner races 22, 24 and outer races 26, 28 with rollers 30, 32 interposed therebetween. A bore 34 terminated by a shoulder 36 is formed in the mill stand chock and receives the outer races. A clamping ring 38 secured by threaded fasteners to the mill stand chock engages the outer race and clamps the bearings in side-by-side engagement, with the outer race contacting the shoulder. A cylindrical supporting surface 42 is provided on the roll neck between an annular shoulder 44 and an annular groove 46. The inner races are located on the supporting surface with the inner race contacting shoulder 44. A bearing retaining ring 48 is positioned on the supporting surface between the inner race and the groove. An oil seal 50 is interposed between the bearing retaining ring and the clamping ring to prevent the escape and contamination of bearing lubricant.

Figure 6:
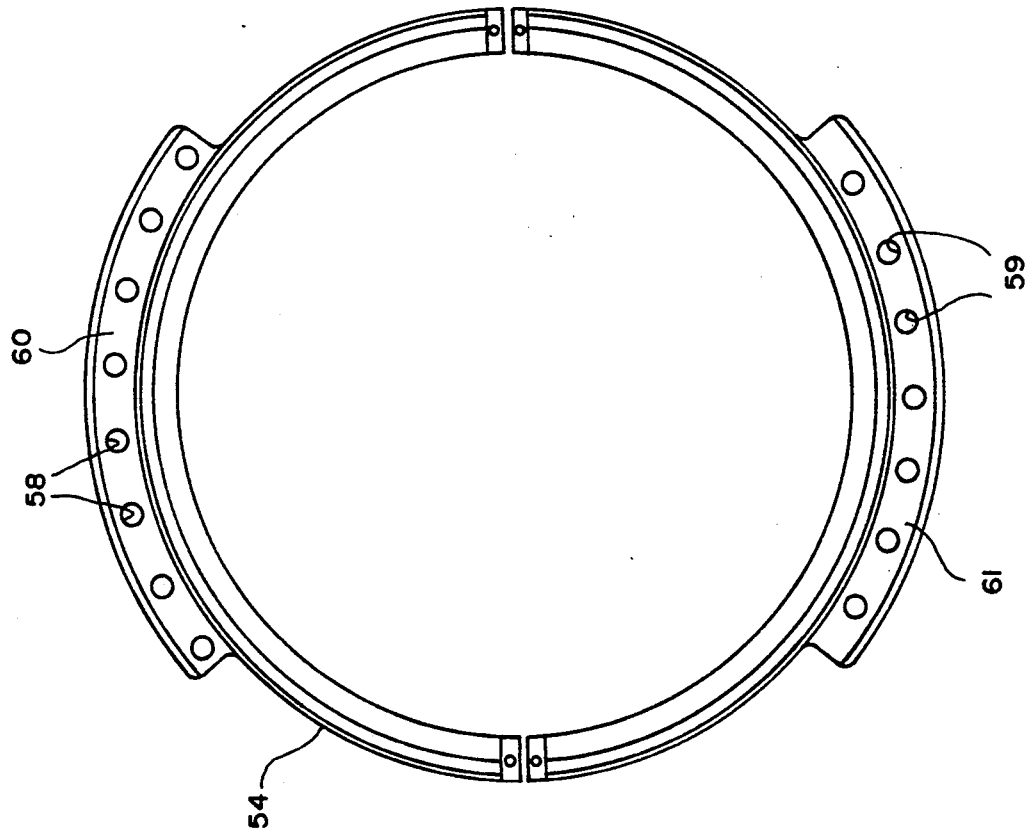
FIG. 6 is a front elevational view of the inner ring of a prior art assembly.

A chocking assembly 52 provides for axially positioning the bearing retaining ring 48 to adjust the chocking of the bearing. The chocking assembly includes an inner ring 54 positioned in the annular groove 46 and an outer ring 56 which bears against the retaining ring 48. The inner and outer rings have cooperating wedge-shaped surfaces which produce axial movement when the outer ring is rotated relative to the inner ring. Chocking is carried out by turning the outer ring until the bearings are clamped tightly between the shoulder and the retaining ring, after which the outer ring is loosened slightly to give the bearings the proper amount of clearance. Upon making the desired adjustment, the rings are secured to one another by insertion of a bolt through a selected set of holes 58, 59 (FIG. 6) in radially extending flange segments 60, 61 of the rings and holes aligned therewith in the outer ring (not shown). As shown in FIG. 6, the two flanges of the inner ring each extend partially around the circumference over an angle less than 90°, and flanges on the outer ring (not shown) extend over a similar angle to enable the outer ring to be passed over the inner ring during assembly, the flanges on the outer ring moving through the gaps between the inner ring flanges. The inner ring is split as shown to enable its placements within the groove.

DESCRIPTION OF THE PREFERRED EMBODIMENT

Figure 2:
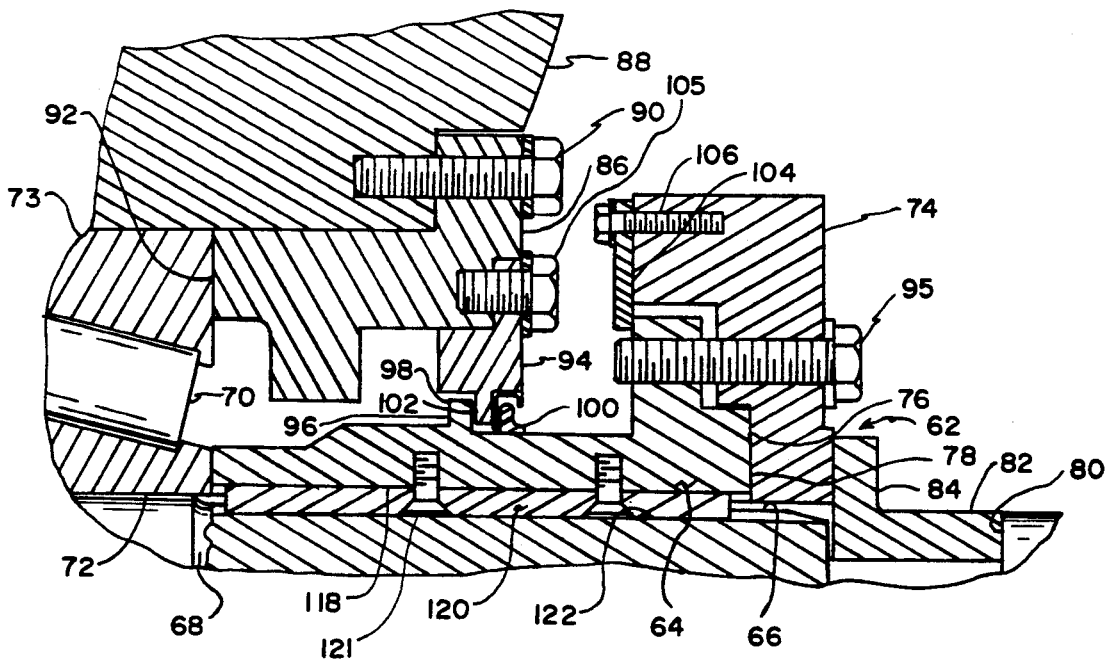
FIG. 2 is a sectional view showing a chocking assembly embodying the present invention.
Figure 3:
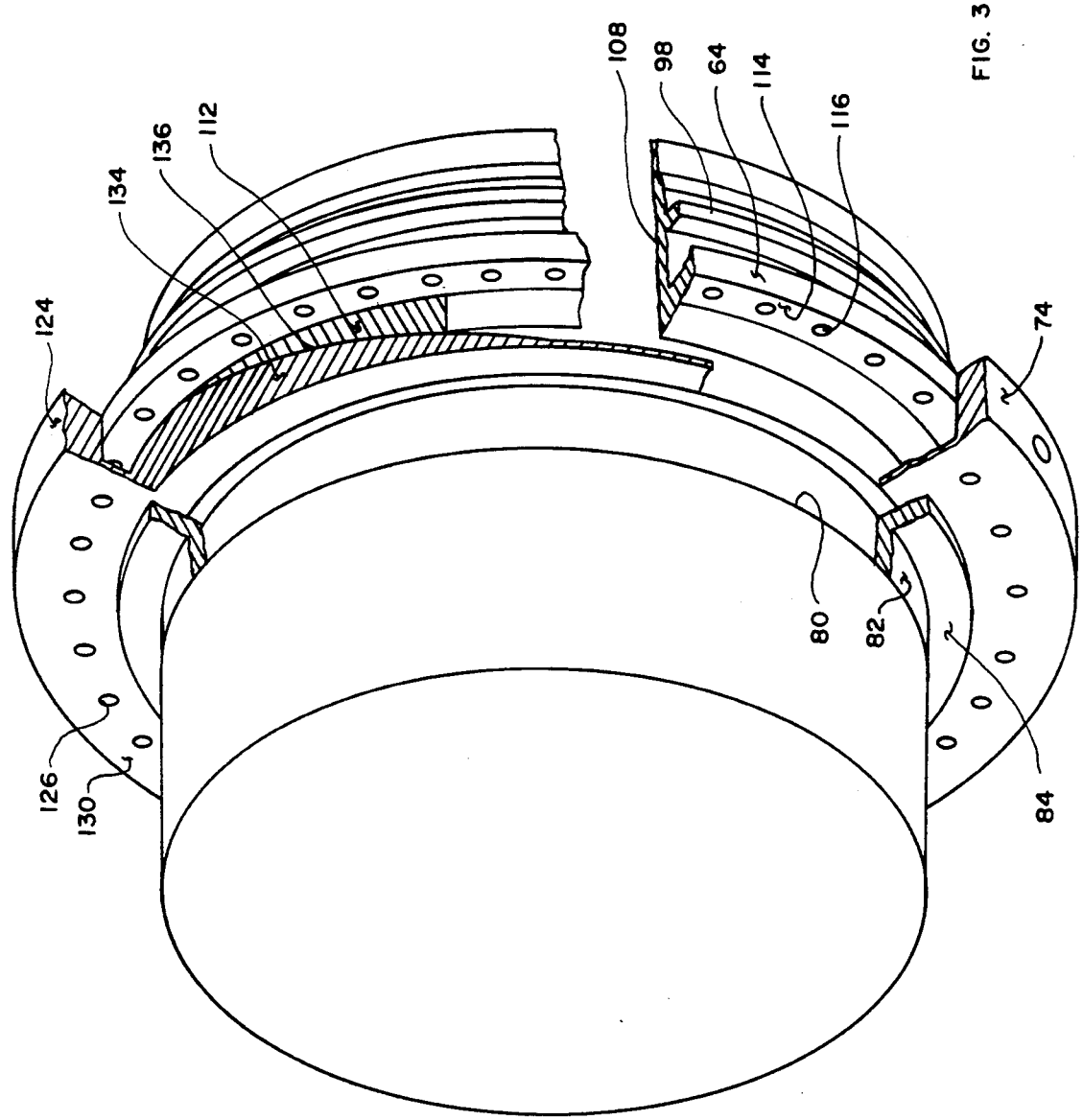
FIG. 3 is a perspective view, partly broken away, showing the bearing chocking assembly in place on a mill roll shaft.

Referring to FIG. 2, a bearing chocking assembly 62 embodying the invention is shown. The assembly includes an inner ring structure 64 disposed on cylindrical surface 66 of mill roll neck 68 and in contact with inner race 72 of roller bearing 70. The bearing and races against which the chocking assembly is placed may be the same as described above for the prior art assembly. An outer ring structure 74 is disposed adjacent to the inner ring with an inward face 76 of the outer ring in contact with outer face 78 of the inner ring. Outer ring 74 is secured in place relative to annular groove 80 in the roll neck by means of a split thrust ring 82 which resides in the groove and has a projecting side portion 84 engaging the outer ring.

The chocking assembly is disposed in cooperating relation with other structural elements that are connected to the chock 88 of the mill stand. For removal of the mill roll for re-grinding, the chock and the connected elements, along with the chocking assembly, are removed from the mill stand as a unit, which is slid off the end of the roll neck. A bearing retainer 86, connected to chock 88 by bolts 90, has an inner side 92 that engages outer race 73 of the bearing and restrains the race from axially outward movement. Seal ring 94, located inside of outward end of the bearing retainer 86, extends radially inward and has a projecting flange 102 in sealing relation with grease seal 100 on one side and is in slightly spaced-apart, facing relation on its other side to flange 98 on the outer circumference of inner ring 74. Seal ring 94 is connected to bearing retainer 86 by botls 105. Flange 96 restrains the inner ring, and other elements of the chocking assembly connected thereto, from sliding axially outward away from the bearing, such movement being stopped upon engagement with flange 98.

A keeper plate 104 is disposed on the inward face of the outer portion of outer ring 74 and is secured thereto by bolts 106. The keeper plate extends past the outer edge of inner ring 64 and restrains the rings from separating from one another when connecting bolts 95 are removed for loosening the assembly from engagement with split ring 82.

Figure 4:
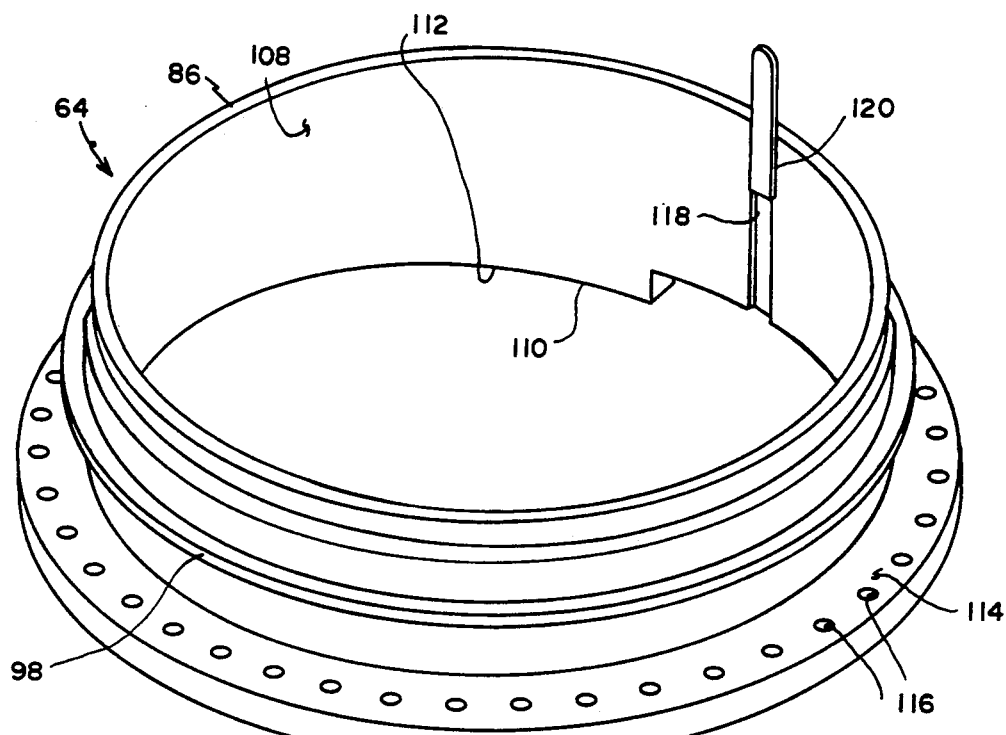
FIG. 4 is a perspective view of the inner ring of the bearing chocking assembly.
Figure 5:
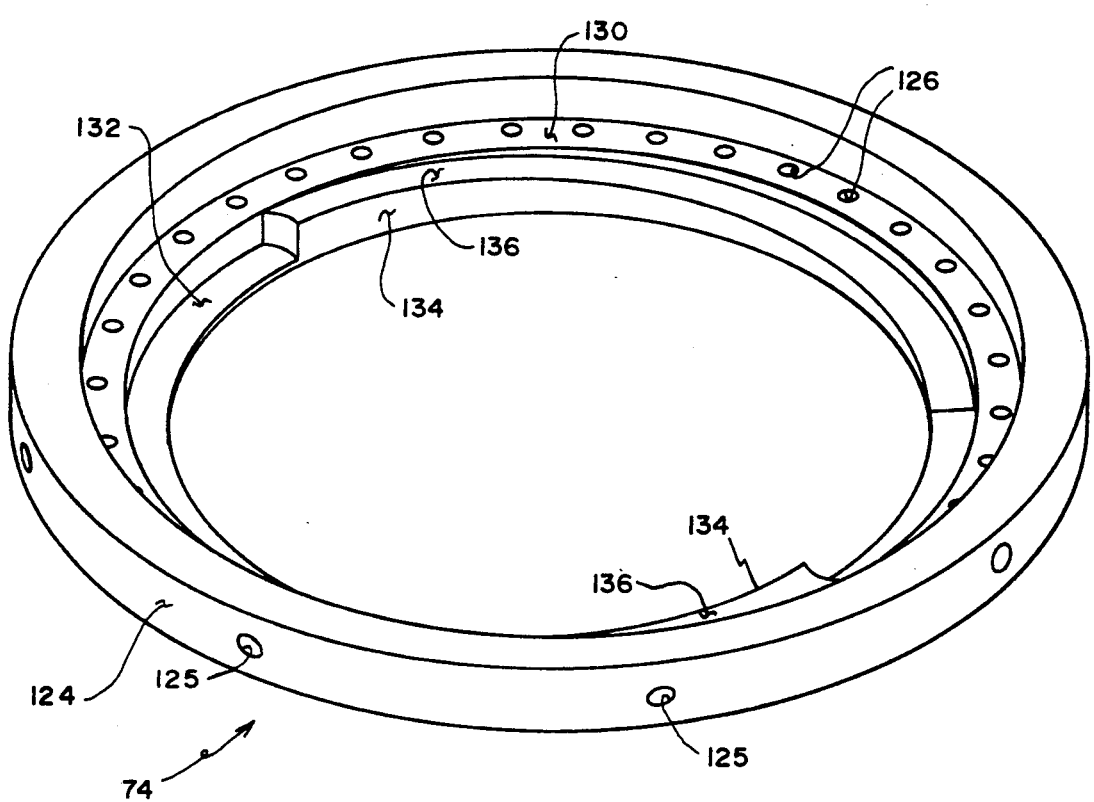
FIG. 5 is a perspective view of the outer ring thereof.

FIGS. 4 and 5 show the structure of inner ring 64 and outer ring 74, respectively. Inner ring 64 has an axially extending wall 108 that fits over cylindrical surface 66 of the roll neck. The outward face of wall 108 has tapered projections 110 in segments extending 90° around the circumference of the ring, providing axially disposed, wedge-shaped cam surfaces 112. The ring has a radially outward extending flange 114 around its entire circumference with spaced-apart, threaded holes 116 for receiving bolts 95 (FIG. 2) to secure the rings together after making axial adjustments as will be described below. An axially extending keyway 118 is provided for engagement with a key 120 that engages a keyway 122 in the roll neck surface.

The outer ring 74 has a tubular outer wall 124 with spaced apart bores 125 around its circumference on its outer side, the bores being engageable with a spanner wrench 128 (FIG. 7) for rotating the ring in making axial adjustments. A radially extending flange 130 is provided inside wall 124, the flange having spaced-apart holes 126 around its circumference. Flange 130 is located so as to come into facing contact with flange 114 of inner ring 64 upon assembly of the rings. Inside of flange 100 an inner lip 132 extends around the circumference of the ring with tapered wedge-shaped projections 134 over an angle such as 135°, providing inclined surfaces 136 for imparting axial movement when forced against mating inclined surfaces 112 of ring 64 by relative rotation of the rings.

In positioning the chocking assembly on a roll neck, the inner ring 64 is first slid over the neck end, bringing the inner end of wall 108 of the ring into engagement with inner race 72 of the bearing, enabling exertion of force on the race in the axial direction. Key 120, secured in axially extending keyway 118 in the inner ring by screws 121, is slid into a mating keyway 122 in the roll neck, restraining the inner ring from rotational movement with respect to the roll neck. Outer ring 74 is slid axially over the inner ring, bring tapered surfaces 136 of outer ring 74 into contact with mating tapered surfaces 112 of the inner ring 64 and disposing flanges 114 and 130 of the rings in parallel, facing alignment. Split thrust ring 82 is then installed in groove 80 to secure the outer ring from moving axially outward on the roll neck.

Figure 7:
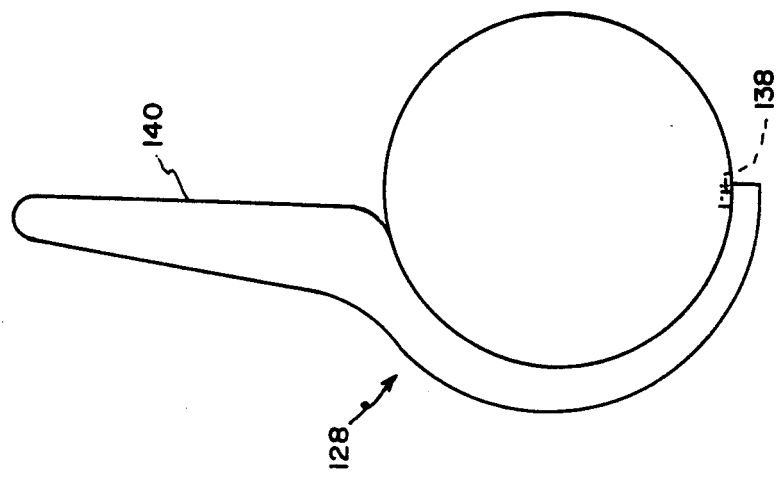
FIG. 7 is a planar view of a spanner wrench for rotating the outer ring of the assembly.

Axial adjustment of the assembly may be carried out by use of a spanner wrench 128 as shown in FIG. 7. The wrench has a lug 138 for insertion in a bore 125 of the outer ring and applying force on the handle 140 to impart rotation. The outer ring is rotated in a direction such that tapered surfaces 136 urge the inner ring axially inward against the bearing race by sliding against surfaces 112 of the inner ring. Rotation is continued until the inner ring firmly clamps the bearings in place. The outer ring is then loosened to provide the desired clearance for operation, which may be obtained by backing the ring off for an angle such as 15°.

Upon reaching the desired axial position, the rings are secured in that position by inserting one or more bolts 95 in a pair holes 126, 116 in flanges 130, 114 respectively, and tightening the bolts. Holes in the respective flanges are offset circumferentially from one another in gradual increments so that for any relative circumferential position of the flanges at least one pair of holes 126, 116 will come into exact axial alignment with one another, thus providing for fine adjustment over a wide range of positions. Separation of the chocking assembly from the roll neck for re-grinding of the roll neck may be carried out by removing bolts 95 and loosening the outer ring so as to release it from engagement with the split thrust ring. The split thrust ring is then removed, allowing the assembly to be slid off the roll neck without further disassembly. The assembly may be reinstalled by sliding it back onto the roll neck, inserting the split thrust ring, and re-chocking the bearings using the procedure described.

In the embodiment described above, the inner ring extends along the roll neck all the way to the bearing race, avoiding the need for a separate retaining ring. This structure is preferred in that it allows the entire chocking assembly to be restrained from separating from the bearing retainer 86 when removed from the mill stand, restraint being imposed by engagement of flanges 102 and 98. A separate retaining ring, disposed between the inner end of the inner ring and the inner race of the bearing as shown in the above-referenced patents, may be employed. This would require, however, that other suitable connections be made to maintain the separate bearing retainer ring and chocking assembly in position.

Although the invention is described above in terms of a bearing chocking assembly for mill rolls of the type used in hot strip rolling mills, it is not to be understood as limited thereto but may also be used on other types of rolling mills. Furthermore, it is to be understood that changes in details of construction may be made without departing from the scope of the invention, which is limited only as indicated by the appended claims.

I claim:

1. A bearing chocking device positionable on a shaft, said shaft having a uniform surface region and a groove extending around the shaft, said device being engageable with said groove for chocking a bearing structure which journals the shaft at a location axially spaced apart from the groove comprising:
    a first ring structure comprising a generally tubular base portion adapted to fit over said uniform surface in flush contact therewith, having defined in one end face thereof a plurality of first arcuate wedge-shaped portions defining axially inclined cam surfaces and including a first circumferential flange perpendicular to said base portion;
    a second ring structure comprising an innermost circumferential portion having defined in one face thereof a plurality of second arcuate wedge-shaped positions providing axially inclined cam surfaces engageable with said first wedge-shaped portions to effect axial movement of said ring structures with respect to one another upon rotation thereof and including a second circumferential flange disposed radially outward from said wedge-shaped portions and located so as to enable the second flange to be brought into facing relation with said first flange;
    connection means around the circumference of said flanges for securing them together upon making axial adjustment of the ring structures;
    keying means associated with said first ring structure for engagement with said shaft, thereby establishing a fixed relation between said first ring and said shaft; and
    locking means engageable with said groove and a said ring structure to prevent axially outward movement of said ring structure.

2. The bearing chocking device of claim 1 wherein said ring structures each have an inner face and an outer face with respect to said groove, said first cam surfaces are located on the outer face of said first ring structure, and said second cam surfaces are located on the inner face of said second ring structure.

3. The bearing chocking device of claim 1 wherein each of said flanges extend around the entire circumference of the ring structures.

4. The bearing chocking device of claim 3 wherein said connection means comprises a plurality of axially extending holes penetrating each of said flanges at spaced intervals around the circumference thereof and at least one threaded fastener engageable with a selected pair of said holes.

5. The bearing chocking device as defined in claim 4 wherein said locking means comprises a split thrust ring having a first portion engageable with said groove and a second portion extending above the uniform surface of said shaft so as to come into contact with said ring structure.

6. The bearing chocking device as defined in claim 1 wherein said second ring structure has an outer tubular wall portion disposed radially outward from said second flange.

7. The bearing chocking device as defined in claim 6 wherein an outer surface of said outer tubular wall of said second ring structure is provided with a plurality of radially extending bores engageable with a tool for imparting rotation thereto.

8. The bearing chocking device as defined in claim 1 wherein said keying means comprises a keyway in the base portion of said first ring structure for engagement with a key.

9. A bearing chocking device positionable on a shaft and engageable with a bearing structure and with a groove extending around the shaft and spaced apart axially from the bearing structure comprising:

a first ring structure having a generally tubular base portion sized to fit over said shaft and defining an inner face engageable with said bearing structure and an outer face having defined therein a plurality of first arcuate, wedge-shaped portions providing first axially inclined cam surfaces, said first ring structure including a flange extending around its entire circumference and disposed outside of and perpendicular to said base portion, a second ring structure including an inner rim portion having defined in an inward face thereof a plurality of second arcuate wedge-shaped portions providing second axially inclined surfaces engageable with said first cam surface so as to effect axially movement of said ring structures with respect to one another upon rotation thereof, a flange portion extending around the entire circumference of the structure and disposed radially outward from said rim portion and located so as to enable the flange portions to be brought into facing relation with the flange portion of said first ring structure and an outer, generally tubular, portion outside of said flange portion perpendicular thereto and adapted to fit over said first ring structure;

connection means associated with said flanges whereby the flanges may be secured together upon making axial adjustment of the ring-shaped structures;

keying means in said first ring structure for establishing a fixed radial position between said first ring structure and said shaft;

locking means engageable with said groove and said rim portion of said second ring structure; and keeper means restraining said outer ring structure from axially outward movement with respect to said inner ring structure upon disengagement of said outer ring structure from said locking means.

10. The bearing chocking device as defined in claim 9 wherein said connection means comprises a plurality of axial holes penetrating each of said flanges at spaced-apart locations around the circumference thereof and bolt means engageable with a selected pair of said holes upon axial adjustment thereof.

11. The bearing chocking device as defined in claim 9 including a plurality of holes in an outer surface of said generally tubular member of said second ring structure engageable with a tool for effecting rotation thereof.

12. The bearing chocking device as defined in claim 9 wherein said locking means comprises a split thrust ring engageable with said groove and said first ring structure.

13. The bearing chocking device as defined in claim 12 wherein said retaining means comprises an axially extending keyway in the inner surface of said first ring engageable with a key.

14. The bearing chocking device as defined in claim 9 wherein said keeper means comprises a plate secured to an inward face of said second ring structure and extending radially inward in position to engage an inward face of said first ring structure.

* * * * *